United States Patent
Onizuka et al.

(10) Patent No.: US 6,472,772 B2
(45) Date of Patent: Oct. 29, 2002

(54) ELECTRIC POWER DISTRIBUTOR FOR USE IN MOTOR VEHICLE

(75) Inventors: Takahiro Onizuka, Yokkaichi (JP); Takehito Kobayashi, Yokkaichi (JP)

(73) Assignees: Autonetworks Technologies, Ltd., Aichi (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/984,295

(22) Filed: Oct. 29, 2001

(65) Prior Publication Data

US 2002/0074979 A1 Jun. 20, 2002

(30) Foreign Application Priority Data

Nov. 2, 2000 (JP) ........................................ 2000-335285

(51) Int. Cl.$^7$ ................................................. B60L 1/00
(52) U.S. Cl. ..................................................... 307/10.1
(58) Field of Search ........................... 363/144; 307/9.1, 307/10.1, 10.6–10.8, 113, 116, 125, 126, 147, 150, 151

(56) References Cited

U.S. PATENT DOCUMENTS

| 5,608,271 | A | * | 3/1997 | Saka et al. ................. 307/10.1 |
| 5,949,148 | A | * | 9/1999 | Wagner ....................... 307/10.1 |
| 5,973,409 | A | * | 10/1999 | Neibecker et al. ......... 307/10.1 |
| 6,278,201 | B1 | * | 8/2001 | Brien et al. .................... 307/62 |

FOREIGN PATENT DOCUMENTS

| JP | 2000-30600 A | 1/2000 |
| JP | 2000-208189 A | 7/2000 |

* cited by examiner

*Primary Examiner*—Matthew Nguyen
(74) *Attorney, Agent, or Firm*—Oliff & Berridge, PLC (57) ABSTRACT

An electric power distributor is mountable on a motor vehicle for distributing power from a power source installed in the motor vehicle to a plurality of electric load units equipped in the vehicle, and is provided with an input conductive strip having an input terminal at one end thereof, a plurality of output conductive strips each having an output terminal at one end thereof, an insulating holder for holding the input conductive strip and the output conductive strips on the same plane, and a plurality of semiconductor switching elements. The input terminal and the output terminals are projected in the same direction substantially orthogonal to the plane of the insulating holder.

11 Claims, 6 Drawing Sheets

ELECTRIC POWER DISTRIBUTOR FOR USE IN MOTOR VEHICLE

BACKGROUND OF THE INVENTION

1. Field of the Invention

This invention relates to an electric power distributor for use in a motor vehicle which is adapted to distribute electric power supplied from a power source such as a battery incorporated in the motor vehicle to a plurality of electric load units equipped in the more vehicle.

2. Description of the Related Art

Heretofore, there has been known an electric connecting box, as a device for distributing electric power supplied from a power source incorporated in a motor vehicle to a plurality of electric load units equipped in the vehicle. The electric connecting box is constructed in such a manner that a number of substrates each mounted with a bus bar are placed one over another to form a distributing circuit, and various elements such as a fuse and a relay switch are provided on the circuit.

Recently, an electric power distributor has been developed to make such an electric connecting box smaller and to accomplish a high-speed switching control. Such an electric power distributor has an arrangement in which semiconductor switching elements such as field effect transistors (FETs) are provided between input terminals and output terminals of the power distributor in place of a relay switch to allow a control circuit of a control circuit board to control on and off of electric current supply.

For instance, Japanese Unexamined Patent Publication No. 10-126963 discloses an arrangement of such a power distributor in which a plurality of semiconductor switching elements (chips) are mounted on a control circuit board, current on/off control terminals (control signal input terminals) of the semiconductor switching elements are connected to a control circuit of the circuit board, input terminals provided at an appropriate position of the respective semiconductor switching elements for supplying electric current are connected to a common metal plate which is connected to a power source for receiving power therefrom whereas output terminals provided at an appropriate position of the respective semiconductor switching elements are connected to bus bars provided in an electric connecting box for outputting power to respective electric load units which are connected to the bus bars.

In the arrangement of the above publication, substrates each mounted with a bus bar thereon are required, in addition to the control circuit board on which the semiconductor switching elements are mounted. Further, these substrates are accommodated in a dedicated casing or box which is made of a material different from that for the control circuit board and the substrates mounted with the bus bars. In addition, connectors for connecting the input terminals and the output terminals to an external circuit provided outside the casing are required inside the box. Thereby, the power distributor as a whole becomes large, and internal wiring for connecting the terminals and the connectors becomes complicated.

SUMMARY OF THE INVENTION

It is an object of the invention to provide an electric power distributor which is free of the above problems residing in the prior art.

According to an aspect of the invention, an electric power distributor is mountable on a motor vehicle for distributing power from a power source installed in the motor vehicle to a plurality of electric load units equipped in the vehicle. The power distributor is provided with an input conductive strip formed with an input terminal at one end thereof, a plurality of output conductive strips each formed with an output terminal at one end thereof, an insulating holder for holding the input conductive strip and the output conductive strips on the same plane, and a plurality of semiconductor switching elements each including an input terminal connected to the input conductive strip and an output terminal connected to a corresponding output conductive strip to control on and off of electric current supply between the input conductive strip and the output conductive strip in accordance with an external control signal. The input terminal and the output terminals are projected in the same direction substantially orthogonal to the plane of the insulating holder.

An inventive electric power distributor is in a compact size, and enables distribution of electric power to a plurality of electric load units without complicated internal wiring.

These and other objects, features advantages of the present invention will become more apparent upon a reading of the following detailed description and accompanying drawing.

DETAILED DESCRIPTION OF THE PREFERRED EMBODIMENTS OF THE INVENTION

A preferred embodiment of the invention is described with reference to the accompanying drawings. First, a circuit configuration of an electric power distributor for use in a motor vehicle according to the embodiment of the invention is described referring to FIG. 1.

Figure 1:
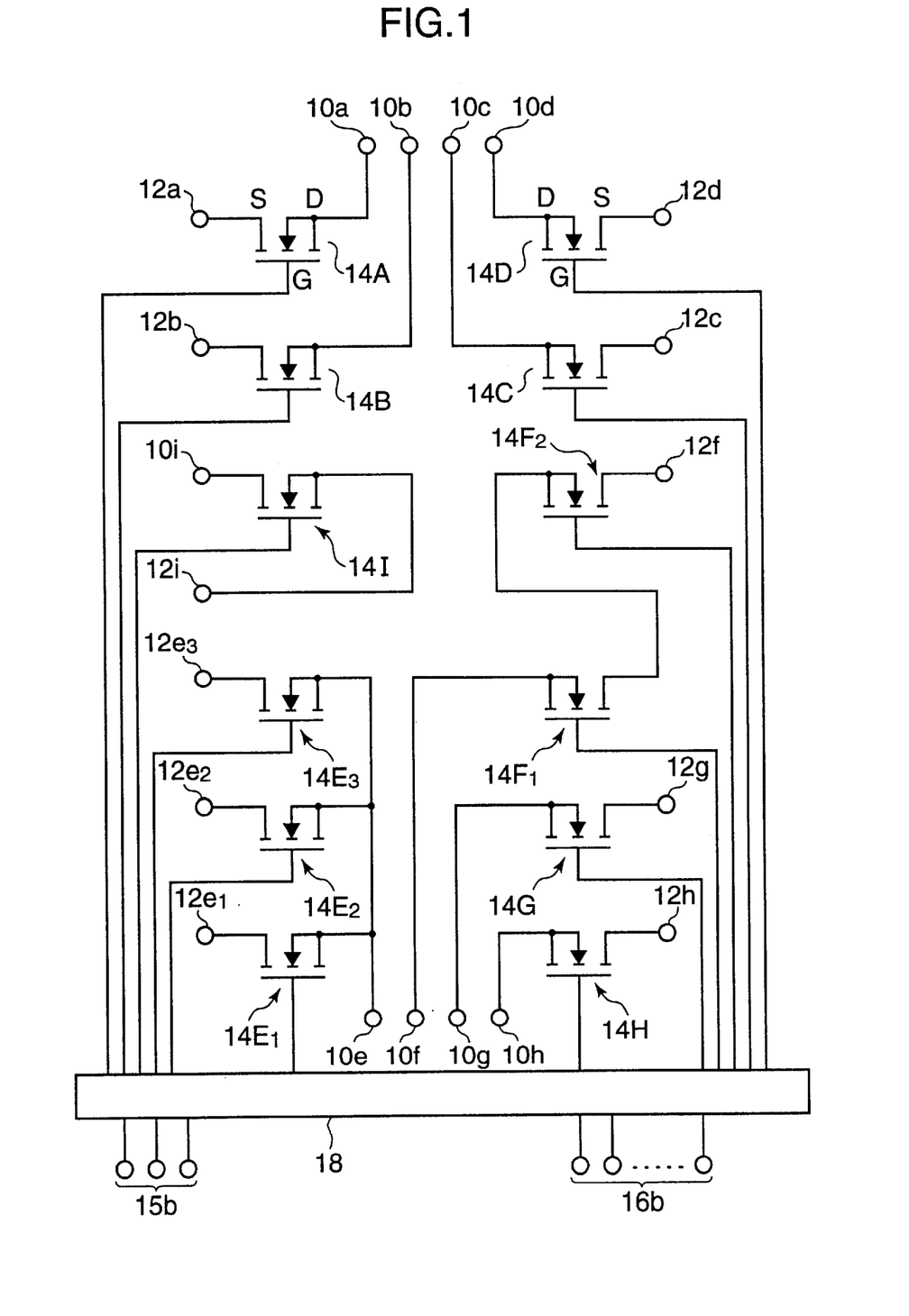
FIG. 1 is an exemplary circuit diagram of an electric power distributor for use in a motor vehicle according to the invention.

The power distributor comprises a number of input terminals 10a, 10b, 10c, 10d which are connected to a common power source (for instance, battery) incorporated in a motor vehicle, and a number of input terminals 10e, 10f, 10g, 10h which are connected to another power source (for instance, alternator) which is also incorporated in the vehicle.

The input terminal 10a is connected to an output terminal 12a via a semiconductor switching element 14A; the input terminal 10b is connected to an output terminal 12b via an element 14B; the input terminal 10c is connected to an output terminal 12c via an element 14C; and an input terminal 10d is connected to an output terminal 12d via an element 14D. The input terminal 10g is connected to an output terminal 12g via an element 14G, and the input terminal 10h is connected to an output terminal 12h via an element 14H. The elements attached with the numeral 14 are each a power MOSFET in FIG. 1, and hereinafter simply referred to as "FET".

The input terminal 10e is connected to output terminals 12$e_1$, 12$e_2$, 12$e_3$ which are connected in parallel via FETs 14$E_1$, 14$E_2$, 14$E_3$, respectively. The input terminal 10f is connected to an output terminal 12f via FETs 14$F_1$, 14$F_2$ which are connected in series.

The power distributor includes, a pair of ground terminals 10i, 12i. An FET 14I is provided between the ground terminals 10i and 12i.

In FIG. 1, with respect to each of the FETs 14A, 14B, ..., 14G, and 14H, a drain D thereof functions as an input terminal and is connected to a corresponding one of the input terminals 10a through 10h, whereas a source S thereof functions as an output terminal and is connected to a corresponding one of the output terminals 12a through 12h. Hereafter, when referring to any one of the FETs 14A through 14H in the power distributor, these FETs are referred to as "FET 14" in general.

A gate G of each of the FETs 14 functions as a control port for inputting a control signal to the FET 14 to control on/off of electric current supply. All the gates G of the FETs 14 are connected to a control circuit of a control circuit board 18. The control circuit is designed in such a manner that a control signal is output therefrom to outside the power distributor via a terminal (signal output terminal) 15b and that an operation signal (including switching signal) and a detection signal are input thereto from outside the power distributor via a terminal (signal input terminal) 16b. In this embodiment, three signal output terminals 15b and nine signal input terminals 16b are provided.

The control circuit controls on/off of supply of electric current with respect to each of the FETs 14, and detects electric current at the FET 14 based on a difference in electric potential between a power source voltage and a source voltage of each of the FETs 14. The control circuit is so designed as to cut the FET 14 off in the case where a detected current at the FET 14 exceeds a predetermined allowable upper limit, and output an alert signal to a display device (not shown).

Next, a construction of the inventive power distributor which is provided with the circuit configuration shown in FIG. 1 is described with reference to FIGS. 2 through 6B.

Figure 2:
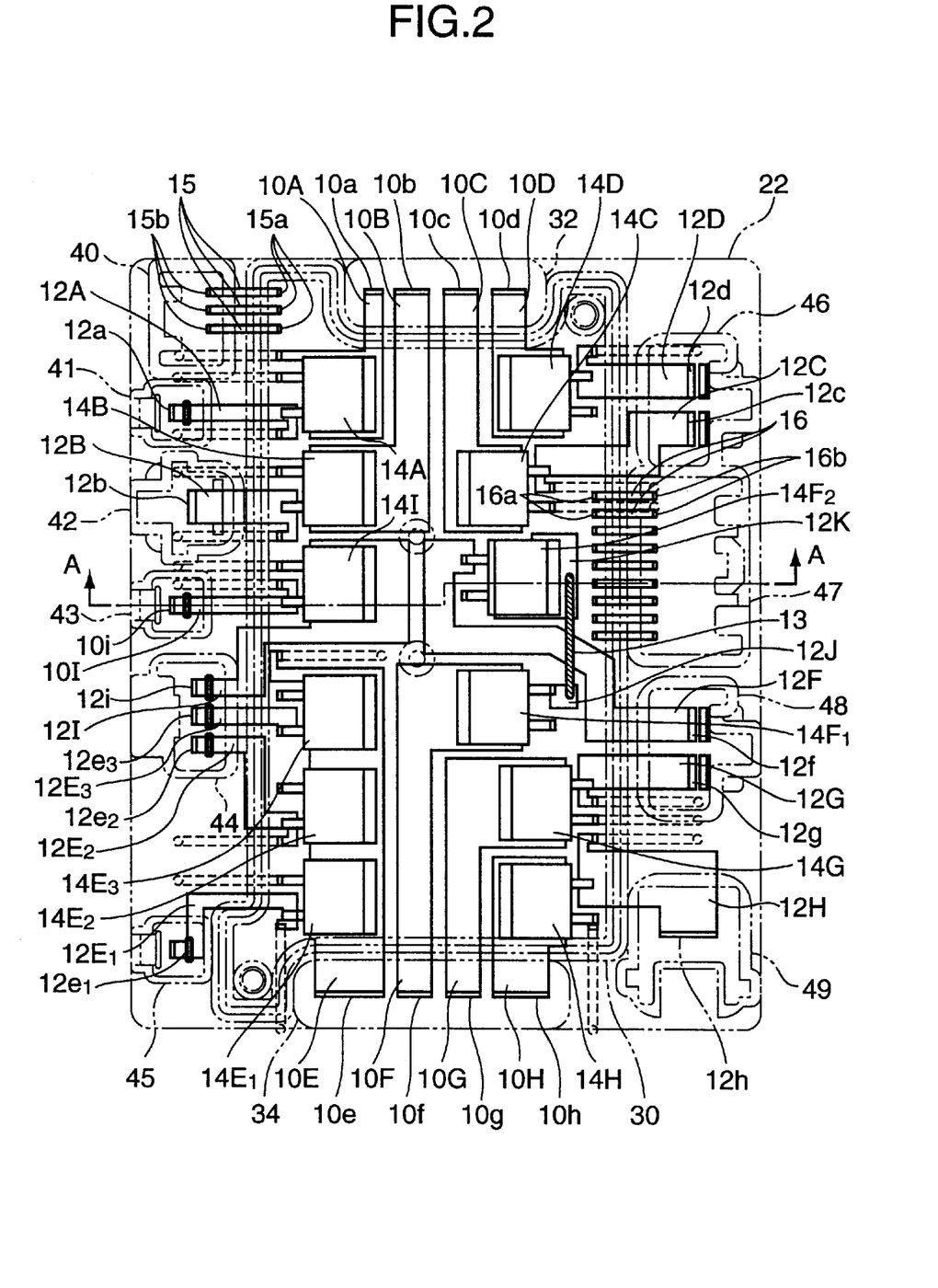
FIG. 2 is a plan view of an internal configuration of the power distributor with an insulating holder of the power distributor shown in a see-through state.

As shown in FIG. 2, the power distributor includes eight conductive strips used for input circuit or bus bars 10A, 10B, 10C, 10D, 10E, 10F, 10G, 10H (hereafter, referred to as "input bus bars"), and ten conductive strips used for output circuit or bus bars 12A, 12B, 12C, 12D, 12$E_1$, 12$E_2$, 12$E_3$, 12F, 12G, 12H (hereafter, referred to as "output bus bars"), and two conductive strips used for ground circuit or bus bars 10I, 12I (hereafter, referred to as "ground bus bars"), and two conductive strips used for relay circuit or bus bars 12J, 12K (hereafter, referred to as "relay bus bars").

The power distributor is integrally held on an insulating holder 22 made of a resin in a state that all the bus bars are arranged on a the same plane by being placed substantially on the same flat surface of the insulating holder 22. This construction can be fabricated by punching a single conductive strip into a certain shape, attaching the insulating holder 22 onto the conductive strip by molding, and cutting appropriate positions on a surface of the conductive strip by a press machine or its equivalent to divide the surface of the conductive strip into independently separated sections to thereby form bus bars.

The input bus bars 10A, 10B, 10C, 10D, 10E, 10F, 10G, 10H each have one end thereof bent upward (In a direction orthogonal to the surface where the bus bars are formed) to form input terminals 10a, 10b, 10c, 10d, 10e, 10f, 10g, 10h, respectively. Likewise, the output bus bars 12A, 12B, 12C, 12D, 12$E_1$, 12$E_2$, 12$E_3$, 12F, 12G, 12H each have one end thereof bent upward to form output terminals 12a, 12b, 12c, 12d, 12$e_1$, 12$e_2$, 12$e_3$, 12f, 12g, 12h, respectively. Likewise, the ground bus bars 10I, 12I each have one end thereof bent upward to form ground terminals 10i, 12i, respectively.

The insulating holder 22 is embedded with three pins (signal output pins) 15 for outputting a signal, and nine pins (signal input pins) 16 for receiving a signal. One end of each of the signal output pins 15 is bent upward to form a terminal 15a which is connected to the circuit board 18 (hereafter, referred to as "board-side terminal 15a"), whereas the opposite end thereof is bent upward to form the signal output terminal 15b for outputting a signal outside the power distributor. Likewise, one end of each of the signal input pins 16 is bent upward to form a terminal 16a which is connected to the circuit board 18 (hereafter, referred to as "board-side terminal 16a"), whereas the opposite end thereof is bent upward to form the signal input terminal 16b for receiving a signal from outside the power distributor.

The insulating holder 22 has, as shown in FIG. 2, a substantially rectangular flat plate-like shape in plan view. The input bus bars 10A to 10H are so arranged as to align the input terminals 10a, 10b, 10c, 10d along one shorter side on the rectangular surface of the insulating holder 22 and to align the input terminals 10e, 10f, 10g, 10h along the opposite shorter side thereof.

The output bus bars 12A through 12H and the ground bus bars 10I, 12I are so arranged as to align the three signal output terminals 15b, the output terminals 12a, 12b, the ground terminals 10i, 12i, and the output terminals 12$e_3$, 12$e_2$, 12$e_1$ along one longer side on the rectangular surface of the insulating holder 22 from the side where the input terminal 10a is located in this order, and to align the nine signal output terminals 16b, and the output terminals 12f, 12g, 12h on the opposite longer side thereof.

The aforementioned terminals are classified into twelve groups as shown in Table 1 to arrange the terminals having substantially the same function as close as possible as one group. Enclosing members 32, 34, and 40 through 49 (see FIG. 4) each enclosing a corresponding one of the groups of the terminals are integrally formed on the insulating holder 22 in such a manner that the corresponding enclosing member encases the corresponding one of the groups of the terminals.

Figure 4:
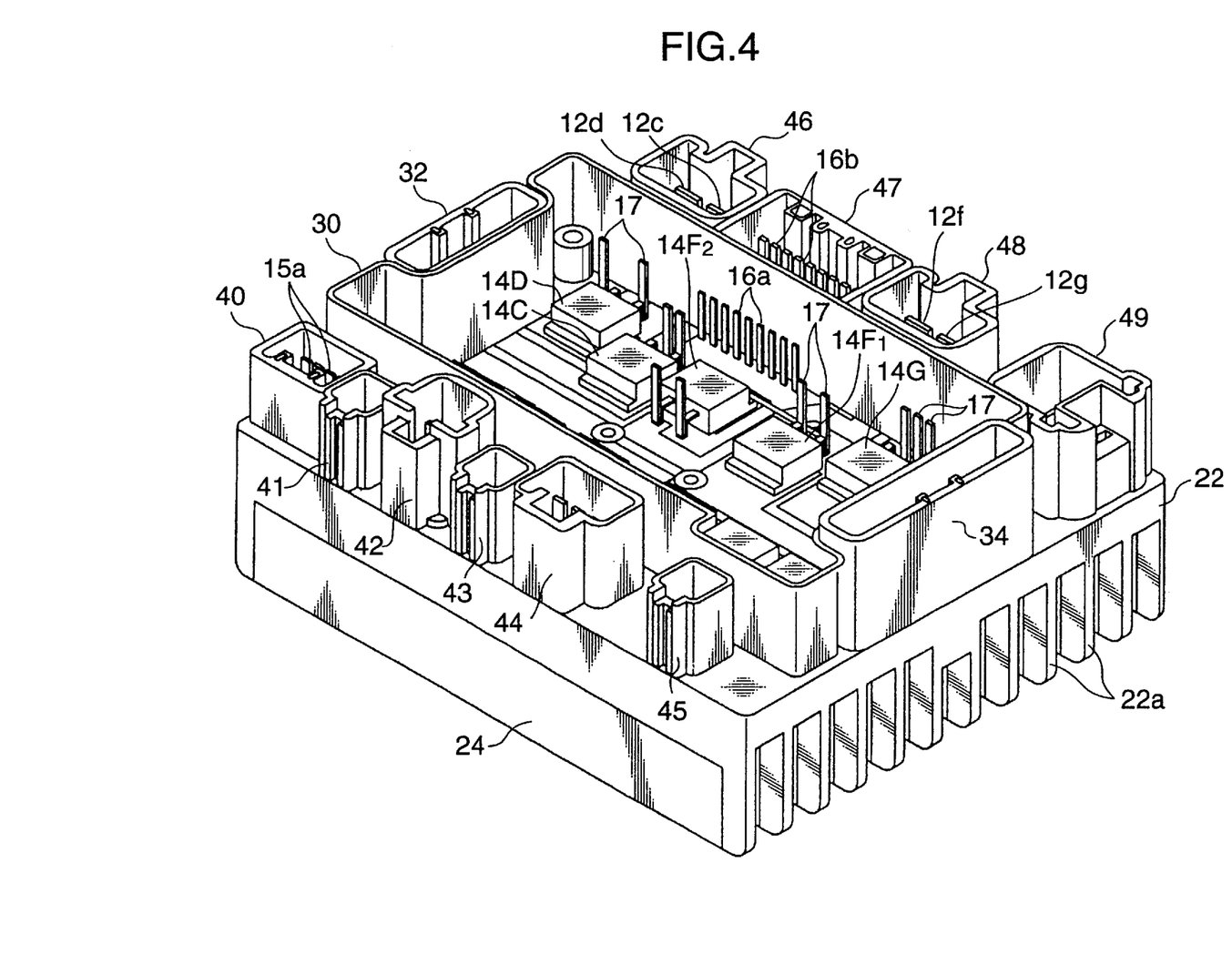
FIG. 4 is a perspective view of the power distributor showing a state that a cover is not mounted on an enclosure wall of the power distributor.

Each of the enclosing members 32, 34, and 40 to 49 have an opening opened upward so as to fittingly accommodate connectors each connected to the corresponding one of the groups of the terminals from above. For instance, the enclosing member 32 which encloses the input terminals 10a to 10d has such a shape as to fittingly accommodate a power-side connector (namely, connector connected to an unillustrated power source installed in a motor vehicle) to which the input terminals 10a to 10d are to be connected.

Figure 3:
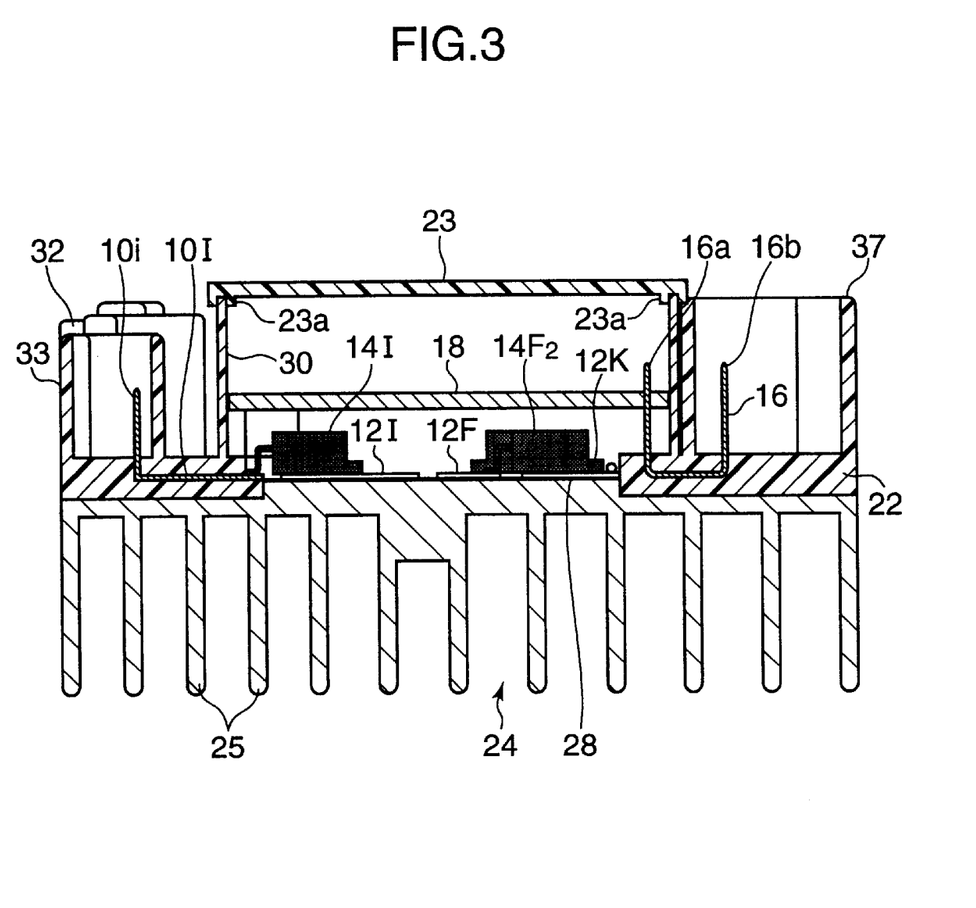
FIG. 3 is a cross-sectional view taken along the line A—A in FIG. 2.

An enclosure wall 30 is formed on the surface of the insulating holder 22 immediately inside the enclosing members 32, 34, and 40 to 49 in such a manner as to define an inner region relative to the enclosing members 32, 34, and 40 to 49. Within the inner region surrounded by the enclosure wall 30, the FETs 14 and the control circuit board 18 are arranged. As shown in FIG. 3, the control circuit board 18 is fixedly supported right above the FETs 14. A cover 23 (see FIG. 5) is placed over the enclosure wall 30 and is jointed thereto. With this construction the FETs 14 and the control circuit board 18 are protected from water coming inside the power distributor.

The FETs 14A, 14B, 14C, 14D, 14F$_1$, 14G, 14H, 14I are respectively mounted on the input bus bars 10A, 10B, 10C, 10D, 10F, 10G, 10H, and the ground bus bar 12I. The FETs 14E$_1$, 14E$_2$, 14E$_3$ are mounted on the common input bus bar 10E, and the FET 14F$_2$ is mounted on the relay bus bar 12K.

Figure 6A:
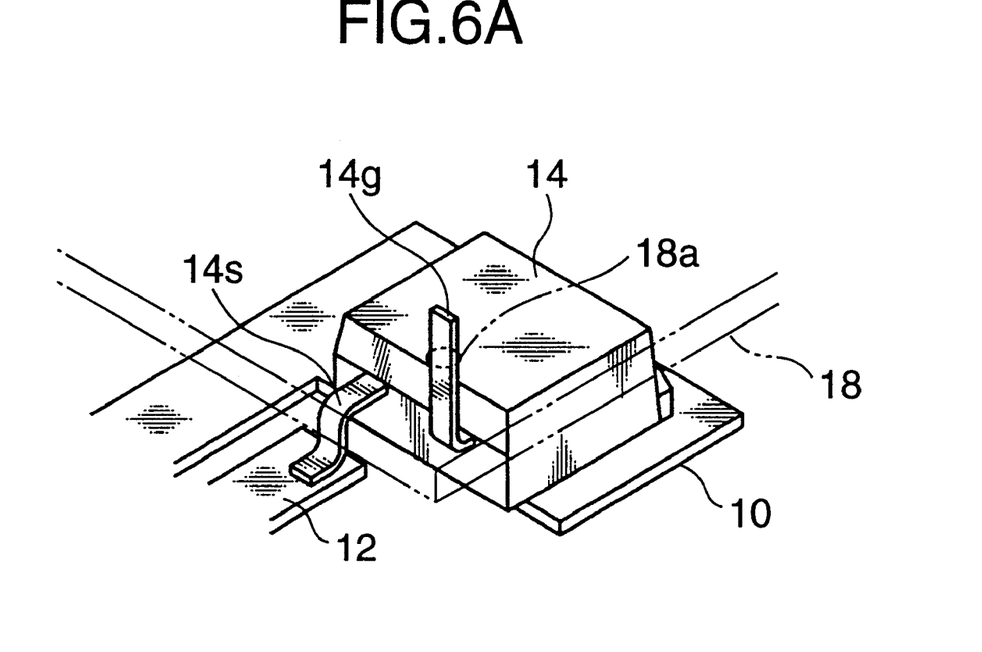
FIGS. 6A and 6B are perspective Views each showing an example of mounting a field effect transistor to a control circuit board.

Referring to FIG. 6A, a drain D of the FET 14 which functions as an input port is formed on the backslide of a main body of the FET 14. The drain D of the FET 14 is electrically connected with an upper surface of the input bus bar 10. Indicated at 14s is a source port of the source S of the FET 14, and indicated at 14g is a gate port of the gate G of the FET 14.

The source port 14s which functions as an output port, and the gate port 14g which functions as a control port are projected from the same side of the main body of the FET 14. The source port 14s is connected to the ground bus bar 10. The gate port 14g is bent upward and inserted in a through hole 18a formed in the control circuit board 18, and is bonded to the control circuit of the control circuit board 18 by a solder or its equivalent.

Figure 6B:
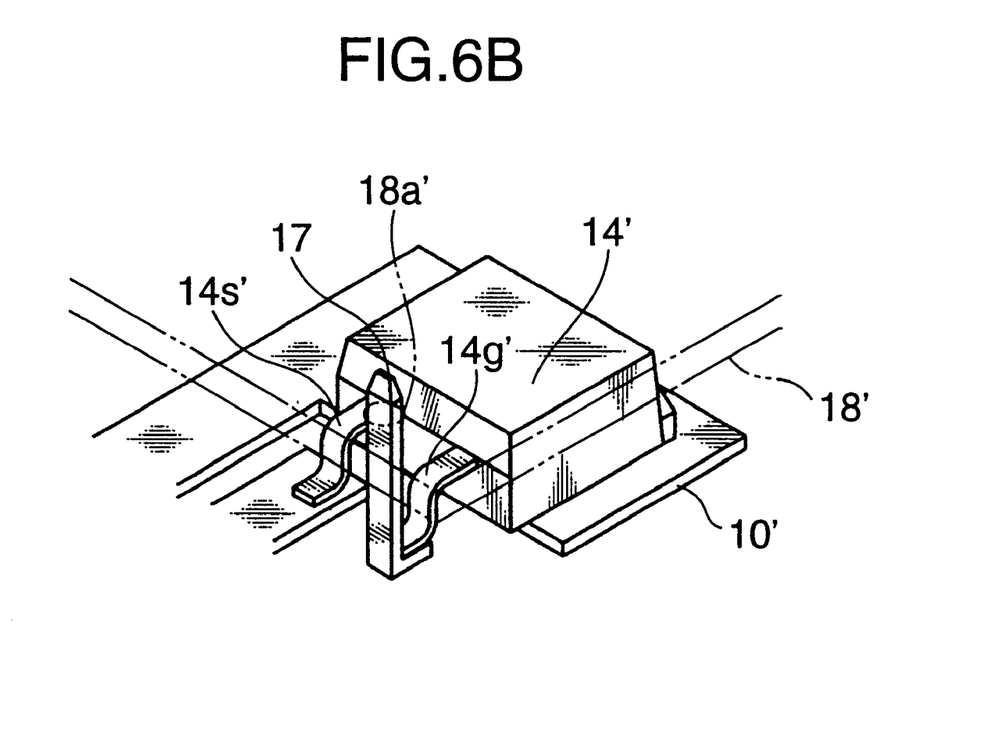

Alternatively, as shown in FIG. 6B, in place of the L-shaped integral gate port 14g as shown in FIG. 6A, a gate port 14g' may be jointed to a tab terminal 17 by welding or its equivalent, and the tab terminal 17 may be bonded to a control circuit board 18'. The arrangement shown in FIG. 6A is preferable to that shown in FIG. 6B in that the FET 14 and the control circuit board 18 can be bonded with a simplified construction with less number of parts.

The drain port 14s of the FET 14A is connected to an inner end (namely, an end opposite to an end constituting the output terminal 12a ) of the output bus bar 12A. The source ports 14s of the FETs 14B, 14C, 14D, 14E$_1$, 14E$_2$, 14E$_3$, 14G, 14H are respectively connected to inner ends of the output bus bars 12B, 12C, 12D, 12E$_1$, 12E$_2$, 12E$_3$, 12G, 12H, and the source port 14s of the FET 14I is connected to an inner end of the ground bus bar 12I.

The source port 14s of the FET 14 F$_1$ is connected to the relay bus bar 12J, and the source port 14s of the FET 14F$_2$ is connected to the output bus bar 12F. The relay bus bars 12J, 12H are bridged over each other by a wire 13. With this arrangement, the input bus bar 10F is connected to the output bus bar 12F en route of the FET 14F$_1$, relay bus bar 14J, the wire 13, the relay bus bar 14K, and the FET 14F$_2$.

The board-side terminals 15a of the signal output pins 15 and the board-side terminals 16a of the signal input pins 16 are provided on the inner region on the surface of the insulating holder 22 relative to the enclosure wall 30. Similarly to the gate ports 14g of the FETs 14, the board-side terminals 15a and the board-side terminals 16a are bonded to the control circuit of the control circuit board 18 in a state that the board-side terminals 15a and 16a are inserted in through holes of the control circuit board 18.

As shown in FIG. 3, a heat releaser 24 is mounted on a bottom surface of the insulating holder 22 in such a manner as to cover the bottom surface of the insulating holder 22.

The heat releaser 24 is an integral member made of a material having a large heat conductivity (or large specific heat) such as aluminum alloy or copper alloy, and is formed with a number of parallel straight fins 25 on a bottom surface of the heat releaser 24 (a surface exposing outside the power distributor). Ribs 22a (see FIGS. 3 and 4) each in the shape of a fin are formed on the lower portion of the insulating holder 22 to cover an end portion of the corresponding one of the fins 25.

As shown in FIG. 3, an insulating sheet 28 made of silicone or its equivalent is placed over an upper surface of the heat releaser 24. Each of the bus bars is formed at a predetermined position (site where the corresponding one of the FETs 14 is to be mounted) on the insulating sheet 28. With this arrangement, the bus bars including the FETs 14 mounted thereon a,re electrically shielded from the heat releaser 24 by the insulating sheet 28 and yet allowed to be thermally communicable outside through the heat releaser 24. Thus, heat emitted from the FETs 14 is efficiently released outside of the power distributor through the heat releaser 24 by way of the insulating sheet 28.

Next, an operation of the power distributor is described. Power output from a battery (not shown) installed in a motor vehicle is input to the input terminals 10a through 10h by connectors (connectors to be fitted in the enclosing members 32, 34) each provided at a terminal end of a wire harness to be connected to the power source, and is input to the drain ports 14d of the FETs 14. During power input to the drain ports 14d of the FETs 14, power input to the drain port 14d of the FET 14 which is in an ON-state is supplied to an electric load unit equipped in the vehicle via the output terminal which is connected to the corresponding source port 14s of the FET 14 and a wire harness which is connected to the electric load unit. It should be noted that the serially-connected FETs 14F$_1$, 14F$_2$ are operated in such a manner that power input to the input terminal 10f is transmitted to the output terminal 12f exclusively when both of the FETs 14F$_1$, 14F$_2$ are in an ON-state.

An operation signal (for instance, a switching signal) sent from an external circuit is input to the control circuit of the control circuit board 18 by a connector (namely, connector to be fitted in the enclosing member 47) which is provided at a terminal end of a wire harness which is connected to the circuit board and the signal input pins 16. The control circuit is operated in such a manner that the control circuit sends a control signal to the gate port 14g of the corresponding one of the FETs 14 upon receiving the operation signal so as to control on/off of supply of electric current between the drain port 14d and the source port 14s of the FET 14. In the case where the FET 14 is switched over to an OFF-state, supply of electric current to the output terminal 12a (12b, 12c, 12d, 12e, 12f, 12g, or 12h) to which the source port 14s of the FET 14 is connected is suspended.

The above constructed power distributor for use in a motor vehicle has the following technical advantageous effects.

All the bus bars including the input bus bars 10A through 10H, the output bus bars 12A through 12H, the relay bus bars 12J, 12K, and the ground bus bars 10I, 12I are held on the insulating holder 22 in a state that the bus bars each in the form of a strip are placed substantially on the same flat surface. Thereby, the power distributor has a small thickness as a whole. Also, the power distributor can be assembled with a simplified construction and with almost no need of internal wiring. The input terminals 10a through 10h, and the output terminals 12a through 12h are so formed as to project in the same direction (direction generally orthogonal to the surface where the bus bars are formed). With this arrangement, the surface area of the power distributor can be minimized.

Further, the input terminals 10a through 10h and the output terminals 12a through 12h are respectively formed by bending end portions of the input bus bars 10A through 10H and the output bus bars 12A through 12H at a substantially right angle. Thereby, the power distributor can be produced without increasing the number of parts.

Figure 5:
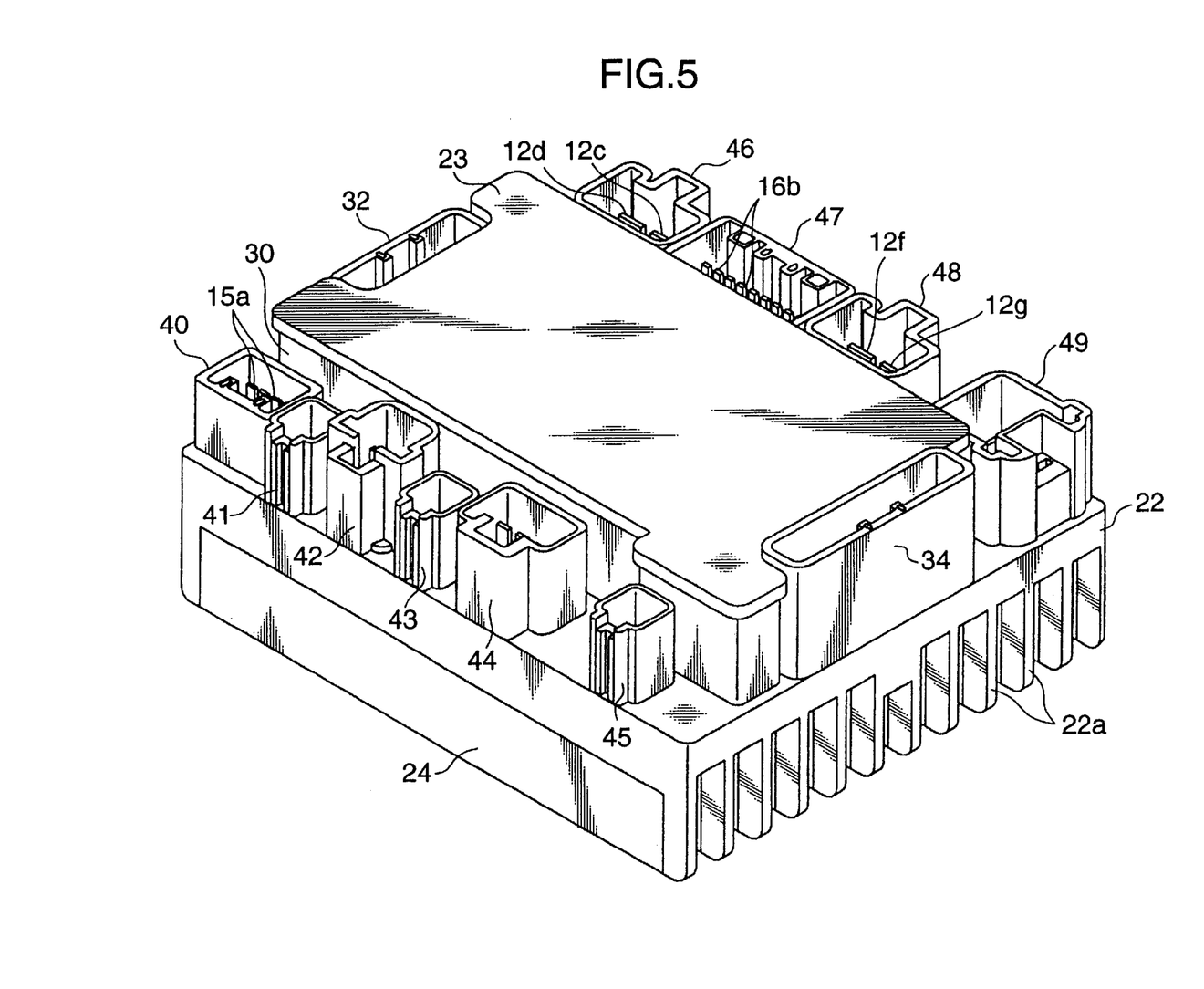
FIG. 5 is a perspective view of the power distributor showing a state that the cover is mounted on the enclosure wall of the power distributor.

Also, a group of input terminals 10a through 10d, and a group of input terminals 10e through 10h are concentratedly arranged at particular locations, respectively, on the surface of the insulating holder 22. Thereby, a connector to be connected to a common power source can be connected to the specific group of the terminals with ease. Particularly, as shown in FIGS. 4 and 5, the enclosing members 32, 34, and 40 through 49 each of which encloses a group of input terminals (or output terminals) and has such a shape as to match with a housing of a connector which is to be connected to the group of the terminals are formed on the insulating holder 22. With this arrangement, each group of the terminals can be effectively protected, and coupling of each group of the terminals with an external connector can be secured.

In the foregoing embodiment, the input terminals 10a through 10h and the output terminals 12a through 12h are arranged on a periphery of the upper surface of the insulating holder 22, whereas the bus bars including the FETs 14 mounted thereon and the control circuit board 18 are arranged on the inner region relative to the input terminals 10a through 10h and the output terminals 12a through 12h. With this arrangement, since the input terminals and the output terminals are arranged on a peripheral region of the surface of the insulating holder 22, the inner region surrounded by these terminals can be efficiently utilized for the bus bars including the FETs 14 mounted thereon and the control circuit board 18 while facilitating connection of the terminals to the external connectors. Thus, the power distributor can be made into a compact size. Since the FETs 14 and the control circuit board 18 are arranged sufficiently close to each other, connection between the FETs 14 and the control circuit board 18 is also easy.

Furthermore, the enclosure wall 30 (protecting member) which encloses the FETs 14 and the control circuit board 18 is formed on the insulating holder 22 at a position inside the input terminals 10a through 10h and the output terminals 12a through 12h. With this arrangement, the input terminals 10a through 10h and the output terminals 12a through 12h which are arranged outside the enclosure wall 30 can be connected to the external connectors while effectively keeping water from coming into the inner region where the FETs 14 and the control circuit board 18 are provided.

In the foregoing embodiment, the insulating holder 22 has a substantially rectangular surface, and the output terminals 12a through 12h are distributed along either one of the longer sides of the rectangular surface, while distributing the input terminals 10a through 10h along either one of the shorter sides thereof. Thereby, power can be distributed from the input terminals 10a through 10h to the output terminals 12a through 12h in a simplified order. Particularly, in the embodiment, the input terminals 10a through 10h are divided into two groups, and these two groups are located at two independent locations, namely, on the opposite shorter sides of the surface of the insulating holder 22. With this arrangement, each group of the terminals can be connected to a corresponding one of power sources while minimizing the surface area of the power distributor even in the case where there are a plurality of kinds of power sources (e.g., battery and alternator) to which the power distributor is to be connected.

This invention is not limited to the aforementioned embodiment, and a variety of modifications and alterations as stated below may be made according to the invention.

The semiconductor switching element used in this invention includes, in addition to a power MOSFET, a variety of kinds of semiconductor elements having a switching function such as other types of transistors including insulated gate bipolar transistors (IGBTs) and bipolar transistors, and various types of thyristors including gate turn-off thyristors (GTO) according to demands of specifications of a motor vehicle in which the power distributor is used. Such a semiconductor switching element is not limited to a packaged device. For instance, a semiconductor chip may directly be mounted on a substrate. A manner as to how the semiconductor switching element is bonded to each terminal is not specifically limited. For instance, a wire may be used at an appropriate position for bonding the Semiconductor switching element and each terminal.

According to the invention, the number and arrangement of the semiconductor switching elements and the output terminals are optimally selectable depending on the arranged position and the number of electrical equipment installed in a motor vehicle.

In the foregoing embodiment, the input terminals 10a through 10h and the output terminals 12a through 12h are formed by bending the end portions of the input bus bars 10A through 10H and the output bus bars 12A through 12H, respectively. Alternatively, terminals may be provided independently of bus bars and bonded to the bus bars substantially in an upright posture relative thereto by welding or its equivalent As an altered form, bus bars (for example, input bus bars 10a through 10d used for inputting power) which are connected to a common power source may be made into a single bus bar.

The insulating holder 22 may be of a non-rectangular form such as an oval shape in plan view which is close to a circular shape. Arranging input terminals and output terminals along an outer circumference on the surface of the insulating holder 22 also enables to align bus bars and semiconductor switching elements in a simplified order while facilitating connection between each terminal and an external connector.

As described above, an inventive electric power distributor comprises: an input conductive strip formed with an input terminal at one end thereof, a plurality of output conductive strips each formed with an output terminal at one end thereof, an insulating holder for holding the input conductive strip and the output conductive strips on the same plane, and plurality of semiconductor switching elements each including an input terminal connected to the input conductive strip and an output terminal connected to a corresponding output conductive strip to control on and off of electric current supply between the input conductive strip and the output conductive strip in accordance width an external control signal. The input terminal and the output terminals are projected in the same direction substantially orthogonal to the plane of the insulating holder.

In this arrangement, the input conductive strip formed with the input terminal and the output conductive strips formed with the output terminals are held on the insulating holder in a state that all the conductive strips each in the form of a strip are arranged on the same plane. Accordingly, the power distributor as a whole has a small thickness. Also, the construction of the power distributor can be simplified with almost no need of internal wiring. Further, since all the input terminals and the output terminals are projected in the direction substantially orthogonal to the plane where the input conductive strips and the output conductive strips are provided. Thereby, the entire surface area of the power distributor can be minimized.

The input terminal and the output terminal may preferably be formed by bending the end portions of the input conductive strip and the output conductive strip at a substantially right angle, respectively. With this arrangement, the input terminal and the output terminal are formed without increasing the number of parts.

The input conductive strip and the input terminal thereof may be single or plural. In the case where there are formed a plurality of conductive strips, accordingly, a plurality of input terminals, the input terminals may be divided into groups, and each group of the input terminals may be located at a particular independent location on the mount surface of the insulating holder. With this arrangement, any of the groups of the input terminals can be connected to a power-side connector which is connected to a common power source, with a single connecting operation.

Preferably, an enclosing member may be formed on the surface of the insulating holder to enclose each one of the independently-located groups of the Input terminals with such a configuration as to match with a housing of an external connector to which the group of the input terminals are to be connected. With this arrangement, any of the groups of the input terminals and the external connector can be coupled in a stable manner while protecting the group of the input terminals from water and other foreign matters by the corresponding enclosing member.

More preferably, the output terminals maybe divided in groups each arranged independently, and an enclosing member may be formed on the surface of the insulating holder to enclose each one of the independently-located groups of the output terminals with such a configuration as to match with a housing of an external connector to which the group of the output terminals are to be connected. With this arrangement, the group of the output terminals and the external connector can be coupled in a stable manner while protecting the group of the output terminals from water and other foreign matters by the corresponding enclosing member.

According to the invention, the arranged position of the input terminal and the output terminal is not specifically limited. Preferably, however, the input terminals and the output terminals may be arranged along the peripheral region on the surface of the insulating holder, while arranging the remaining portions of the input conductive strips and the output conductive strips, and the semiconductor switching elements on the inner region on the surface of the insulating holder.

In this arrangement, the input terminals and the output terminals are located on the periphery on the surface of the insulating holder. Thereby, the inner region on the surface of the insulating holder which is surrounded by the input terminals and the output terminals is utilized for arranging the remaining portions of the input conductive strips and the output conductive strips, and the semiconductor switching elements. Thus, the power distributor of a compact size can be produced.

Preferably, the surface of the insulating holder may have a substantially rectangular shape. Distributing the output terminals on either one of the two longer sides on the rectangular surface of the insulating holder and arranging the input terminal on either one of the two shorter sides thereof enables to distribute power supply from the input terminal to the output terminals in a simplified order.

In the case where there are a plurality of kinds of power sources to be connected to the power distributor (for example, battery and alternator) it may be preferable to divide a plurality of input terminals in groups and arrange each group on either one of the two shorter sides on the surface of the insulating holder. Thereby, the surface area of the power distributor as a whole can be minimized.

The arrangement that the input terminals and the output terminals are arranged along the periphery on the surface of the insulating holder is advantageous in that a control circuit board can be mounted on the inner region of the surface of the insulating holder to output a control signal from a control terminal of each of the semiconductor switching elements to the control circuit board. With this arrangement, the entire construction of the power distributor can be made small.

In the above arrangement, since the control circuit board and the semiconductor switching elements are disposed close to each other, a portion of the control terminal of each of the semiconductor switching elements can be rendered in direct contact with the control circuit board. Thereby, parts for bonding the control circuit board and each of the semiconductor switching elements are omitted, which contributes to production of a power distributor having a more simplified construction.

Preferably, a enclosure wall may be formed on the surface of the insulating holder at an inner position relative to the input terminals and the output terminals to enclose the semiconductor switching elements and the control circuit board for keeping the semiconductor switching elements and the control circuit board from water. With this arrangement, connection of the input terminals (the output terminals) which are located outside the enclosure wall to the external connector can be facilitated while effectively protecting the semiconductor switching elements and the control circuit board from water by the enclosure wall serving as a protecting member.

This application is based on patent application No. 2000-335285 filed in Japan, the contents of which are hereby incorporated by references.

As this invention may be embodied in several forms without departing from the spirit of essential characteristics thereof, the present embodiment is therefore illustrative an not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. An electric power distributor mountable on a motor vehicle for distributing power from a power source installed in the motor vehicle to a plurality of electric load units equipped in the vehicle, the power distributor comprising:

an input conductive strip formed with an input terminal at one end thereof;

a plurality of output conductive strips each formed with an output terminal at one end thereof;

an insulating holder for holding the input conductive strip and the output conductive strips on the same plane; and a plurality of semiconductor switching elements each including an input terminal connected to the input conductive strip and an output terminal connected to a corresponding output conductive strip to control on and off of electric current supply between the input conductive strip and the output conductive strip in accordance with an external control signal, wherein the input terminal and the output terminals are projected in the same direction substantially orthogonal to the plane of the insulating holder.

2. The electric power distributor according to claim 1, wherein the input terminal of the input conductive strip and the output terminal of the output conductive strip are formed by bending the end portions of the input conductive strip and the output conductive strip at a substantially right angle, respectively.

3. The electric power distributor according to claim 1, wherein a plurality of input conductive strips are provided, and each input conductive strip is formed with an input terminal at one end thereof, and their input terminals are concentratedly arranged in a particular location.

4. The electric power distributor according to claim 3, further comprising an enclosing member for enclosing concentratedly-arranged input terminals, the enclosing member having such a shape as to match with a housing of a connector to be connected to the concentrately-arranged input terminals.

5. The electric power distributor according to claim 1, wherein a specified number of output terminals are arranged in a particular location, further comprising an enclosing member for enclosing the specified number of output terminals, the enclosing member having such a shape as to match with a housing of a connector to be connected to the output terminals.

6. The electric power distributor according to claim 1, wherein the insulating holder has a mount surface, the input and output terminals are arranged in a peripheral region of the mount surface, and the remaining potions of the input and output conductive strips and the semiconductor of output elements are arranged in an inner region inner than the peripheral region.

7. The electric power distributor according to claim 1, wherein the mount surface has a substantially rectangular shape, and the output terminals are arranged along the opposite longer sides of the mount surface, and the input terminal is arranged on either one of the opposite shorter sides of the mount surface.

8. The electric power distributor according to claim 7, wherein a plurality of input terminals are arranged along the opposite shorter sides of the mount surface.

9. The electric power distributor according to claim 6, further comprising a control circuit board for sending a control signal to the semiconductor switching elements, the control circuit board being arranged in the inner region.

10. The electric power distributor according to claim 9, wherein each semiconductor switching element has a control port directly connected with the control circuit board.

11. The electric power distributor according to claim 9, further comprising an enclosure wall for enclosing the semiconductor switching elements and the control circuit board.

* * * * *